J. A. OLAVESSEN.
SEAL FOR MILK BUCKETS.
APPLICATION FILED MAR. 25, 1918.
1,293,892.
Patented Feb. 11, 1919.
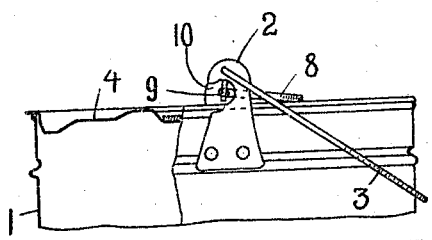
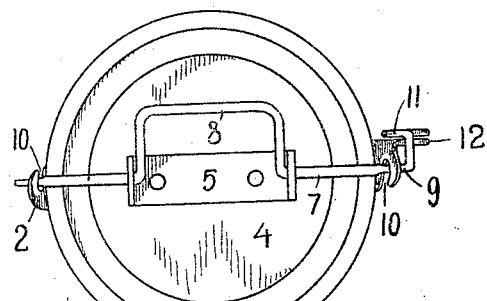
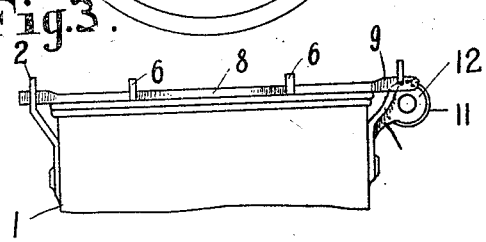
Inventor.
Johan Albert Olavessen,
By Henry Ort Jr. atty

UNITED STATES PATENT OFFICE.

JOHAN ALBERT OLAVESSEN, OF LILLESTROMMEN, NORWAY, ASSIGNOR OF ONE-HALF TO HELMER HUSEBYE, OF CHRISTIANIA, NORWAY.

SEAL FOR MILK-BUCKETS.

1,293,892.  Specification of Letters Patent.  Patented Feb. 11, 1919.

Application filed March 25, 1918. Serial No. 224,631.

*To all whom it may concern:*

Be it known that I, JOHAN ALBERT OLAVESSEN, a subject of the King of Norway, residing at Lillestrommen, in the Kingdom of Norway, have invented certain new and useful Improvements in Seals for Milk-Buckets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improved lock or seal for milk buckets and the like.

The milk buckets now in use have mostly the deficiency that the lid does not close tightly so that dust finds its way into the milk during the transport and if the bucket is upset the milk will flow out. The present invention has for its object to provide a simple and absolutely reliable locking device for such buckets.

In the accompanying drawing—

Figure 1 is a top view of a bucket embodying my invention.

Fig. 2 is a side view partly in section showing the bucket closed and the usual bail attached thereto.

Fig. 3 is a view of another side of the bucket.

The bucket 1 is provided as usual with ears 2 for a bail or handle 3. In the middle of the lid 4, which is slightly conical, is fixed a shackle 5 through the upwardly extending ears 6 of which is passed a rod 7 which is provided with a crank-shaped bend or shackle 8. The rod ends 9 are flattened in a plane perpendicular to this shackle 8 as shown in Fig. 2. The flattened ends 9 of the rod extend into lateral notches in the ears 2 of the bucket. When the lid is to be applied it is turned with the shackle 8 in upright position and serves as a handle so as to cause the rod ends 9 to engage in the notches 10 on the bucket ears. On pressing down the shackle 8 against the lid to the position shown in the drawing, the rod ends 9 will be pressed edgewise against the upper edge of the notch 10. In this position, in which the lid of the bucket is pressed fast and tightly on to the opening of the bucket by an eccentric action, the rod ends are secured by the resiliency of the lid or of the rod as they will have passed by the dead point as will be seen from Fig. 2, so as not to allow of being disengaged until the shackle 8 has been thrown up.

One of the rod ends has an extension beyond the flattened part 9 and this extension is bent into an eye 11 which, when the locking rod is in locking position as shown, will abut against the corresponding eye 12 on the bucket. On the drawing this eye 12 is provided for by bending a strip of the bucket ear 2. Through these two eyes 11 and 12 may be passed a padlock or other locking device or a plumb for locking or sealing the bucket.

Claim:

The combination of a pail, ears thereon forming a connection for the bail, one of said ears having a perforated portion at right angles thereto, a lid for the pail, a rod journaled on the lid having wide flattened portions adapted to take into notches formed in said ears and a central crank portion for rotating the rod, one end of said rod having an eye formed thereon and arranged to be moved by the crank into register with the perforation of said ear, for the purpose specified.

In testimony that I claim the foregoing as my invention, I have signed my name in presence of two subscribing witnesses.

JOHAN ALBERT OLAVESSEN.

Witnesses:
M. W. KAHRI,
H. E. CARLSON.

Copies of this patent may be obtained for five cents each, by addressing the "Commissioner of Patents, Washington, D. C."